US012654327B2

(12) United States Patent
Oka et al.

(10) Patent No.: US 12,654,327 B2
(45) Date of Patent: Jun. 16, 2026

(54) PICKING SYSTEM, CONTROL DEVICE, PICKING METHOD, AND STORAGE MEDIUM

(71) Applicant: KABUSHIKI KAISHA TOSHIBA, Tokyo (JP)

(72) Inventors: Yoshifumi Oka, Yokohama (JP); Hirofumi Kawai, Kawasaki (JP); Kenichi Shimoyama, Ota (JP); Seiji Tokura, Kawasaki (JP); Akihito Ogawa, Fujisawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 751 days.

(21) Appl. No.: 18/054,227

(22) Filed: Nov. 10, 2022

(65) Prior Publication Data
US 2023/0150138 A1 May 18, 2023

(30) Foreign Application Priority Data
Nov. 12, 2021 (JP) ................................. 2021-184953

(51) Int. Cl.
*B25J 13/08* (2006.01)
*B25J 9/16* (2006.01)
(Continued)

(52) U.S. Cl.
CPC ............. *B25J 9/1687* (2013.01); *B25J 13/08* (2013.01); *G06T 7/11* (2017.01); *G06T 7/62* (2017.01)

(58) Field of Classification Search
CPC ........ B25J 13/08; B25J 9/1664; B25J 9/1697; G06T 7/11; G06T 7/62
(Continued)

(56) References Cited

U.S. PATENT DOCUMENTS 5,446,835 A 8/1995 Iida et al.
5,501,571 A 3/1996 Van Durrett et al.
(Continued)

FOREIGN PATENT DOCUMENTS

CN 104057447 A 9/2014
CN 107756422 A 3/2018
(Continued)

OTHER PUBLICATIONS

Combined Chinese Office Action and Search Report issued Jun. 17, 2025 in Chinese Patent Application No. 202211411236.5, (with English machine translation), 17 pages.

*Primary Examiner* — Gene O Crawford
(74) *Attorney, Agent, or Firm* — Oblon, McClelland, Maier & Neustadt, L.L.P.

(57) ABSTRACT

According to one embodiment, a picking system includes a picking robot and a control device. The picking robot transfers an object from a first space to a second space by using a robot hand. The control device controls the picking robot. When a first measurement result related to a shape of the object in the first space when viewed along a first direction is acquired, the control device performs a first calculation of calculating a position candidate for placing the object in the second space based on the first measurement result. When a second measurement result related to a shape of the object when viewed along a second direction is acquired, the control device performs a second calculation of calculating a position of the robot hand when placing the object in the second space based on the second measurement result and the position candidate.

13 Claims, 10 Drawing Sheets

(51) Int. Cl.
　*G06T 7/11* (2017.01)
　*G06T 7/62* (2017.01)
(58) Field of Classification Search
　USPC ........ 700/217, 218, 219, 245, 246, 247, 253
　See application file for complete search history.

(56) References Cited

U.S. PATENT DOCUMENTS

| | | | |
|---|---|---|---|
| 2009/0171500 A1* | 7/2009 | Matsumoto et al. .. B65G 1/137 |
| 2010/0004778 A1 | 1/2010 | Arimatsu et al. |
| 2013/0158947 A1 | 6/2013 | Suzuki |
| 2014/0067317 A1 | 3/2014 | Kobayashi et al. |
| 2014/0277694 A1 | 9/2014 | Ichimaru |
| 2015/0127162 A1 | 5/2015 | Gotou |
| 2016/0016311 A1 | 1/2016 | Konolige et al. |
| 2019/0389069 A1 | 12/2019 | Kalbavi et al. |
| 2020/0078941 A1 | 3/2020 | Oka et al. |
| 2020/0130961 A1 | 4/2020 | Diankov et al. |
| 2020/0134828 A1 | 4/2020 | Diankov et al. |
| 2020/0238519 A1* | 7/2020 | Diankov et al. ....... B25J 9/1664 |
| 2020/0269428 A1 | 8/2020 | Ukisu et al. |
| 2020/0391385 A1 | 12/2020 | Oka et al. |
| 2021/0154839 A1 | 5/2021 | Diankov et al. |

FOREIGN PATENT DOCUMENTS

| | | |
|---|---|---|
| CN | 110494259 A | 11/2019 |
| CN | 111936404 A | 11/2020 |
| JP | 5-127724 A | 5/1993 |
| JP | 2013-130426 A | 7/2013 |
| JP | 2014-046433 A | 3/2014 |
| JP | 2014-176923 A | 9/2014 |
| JP | 2019-28775 A | 2/2019 |
| JP | 2020-40158 A | 3/2020 |
| JP | 2020-40780 A | 3/2020 |
| JP | 2020-132422 A | 8/2020 |
| JP | 2021-501102 A | 1/2021 |
| JP | 2021-54660 A | 4/2021 |
| JP | 2021-62978 A | 4/2021 |
| WO | WO 2020/092428 A1 | 5/2020 |

* cited by examiner

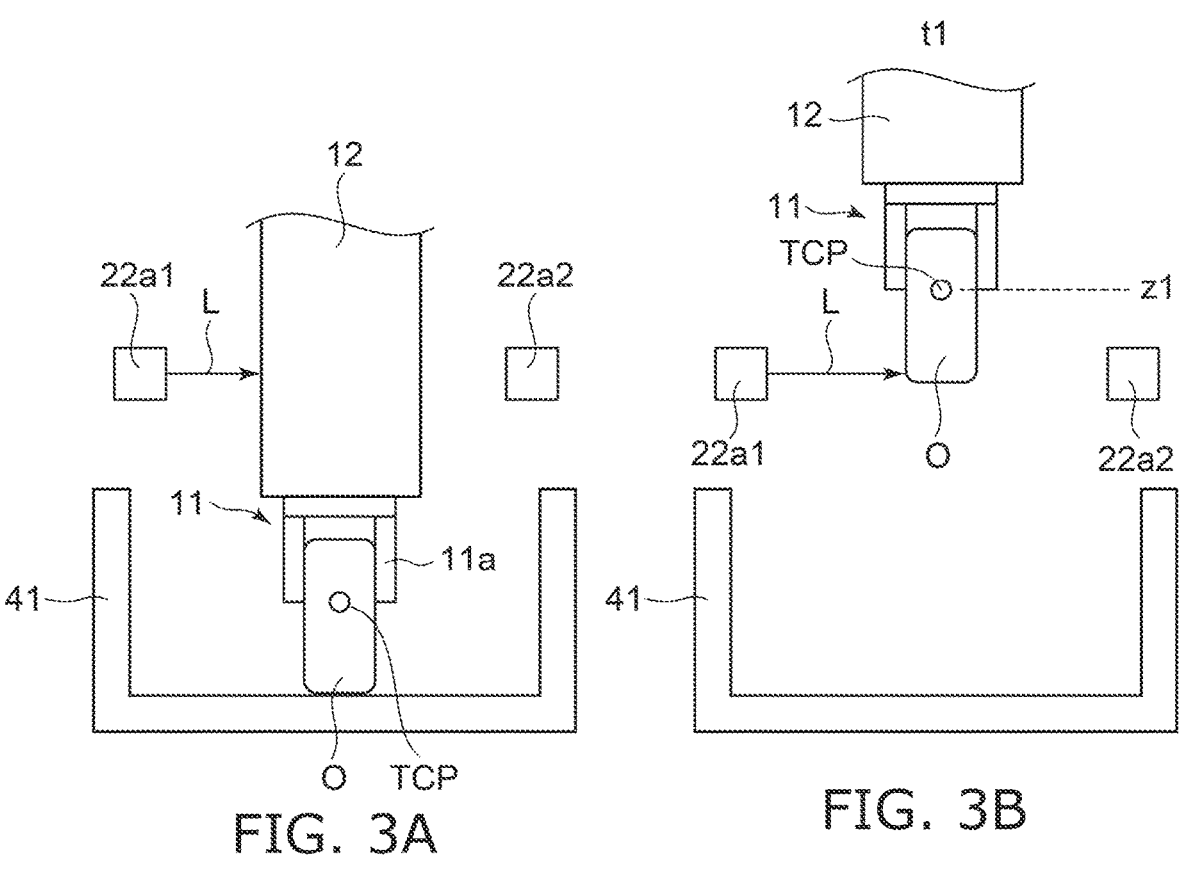
FIG. 3A
FIG. 3B
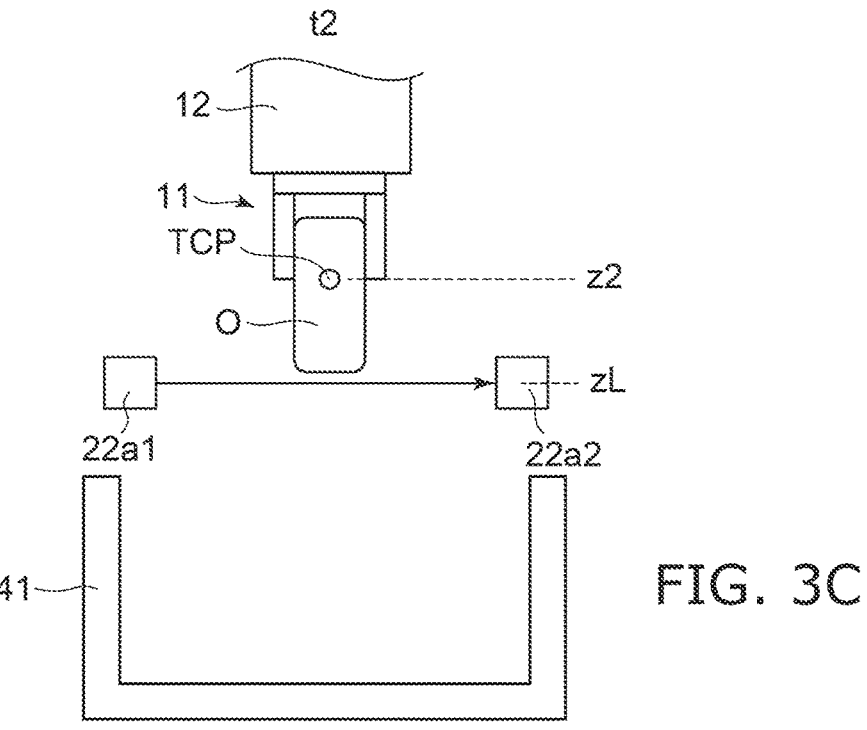
FIG. 3C

PICKING SYSTEM, CONTROL DEVICE, PICKING METHOD, AND STORAGE MEDIUM

CROSS-REFERENCE TO RELATED APPLICATIONS

This application is based upon and claims the benefit of priority from Japanese Patent Application No. 2021-184953, filed on Nov. 12, 2021; the entire contents of which are incorporated herein by reference.

FIELD

Embodiments described herein relate generally to a picking system, a control device, a picking method, and a storage medium.

BACKGROUND

There is a picking system that transfers an object. Picking system technology that can reduce the time necessary for the picking task is desirable.

BRIEF DESCRIPTION OF THE DRAWINGS

FIGS. 3A to 3C are schematic views for describing the method for measuring the second measuring instrument;

DETAILED DESCRIPTION

Figure 1:
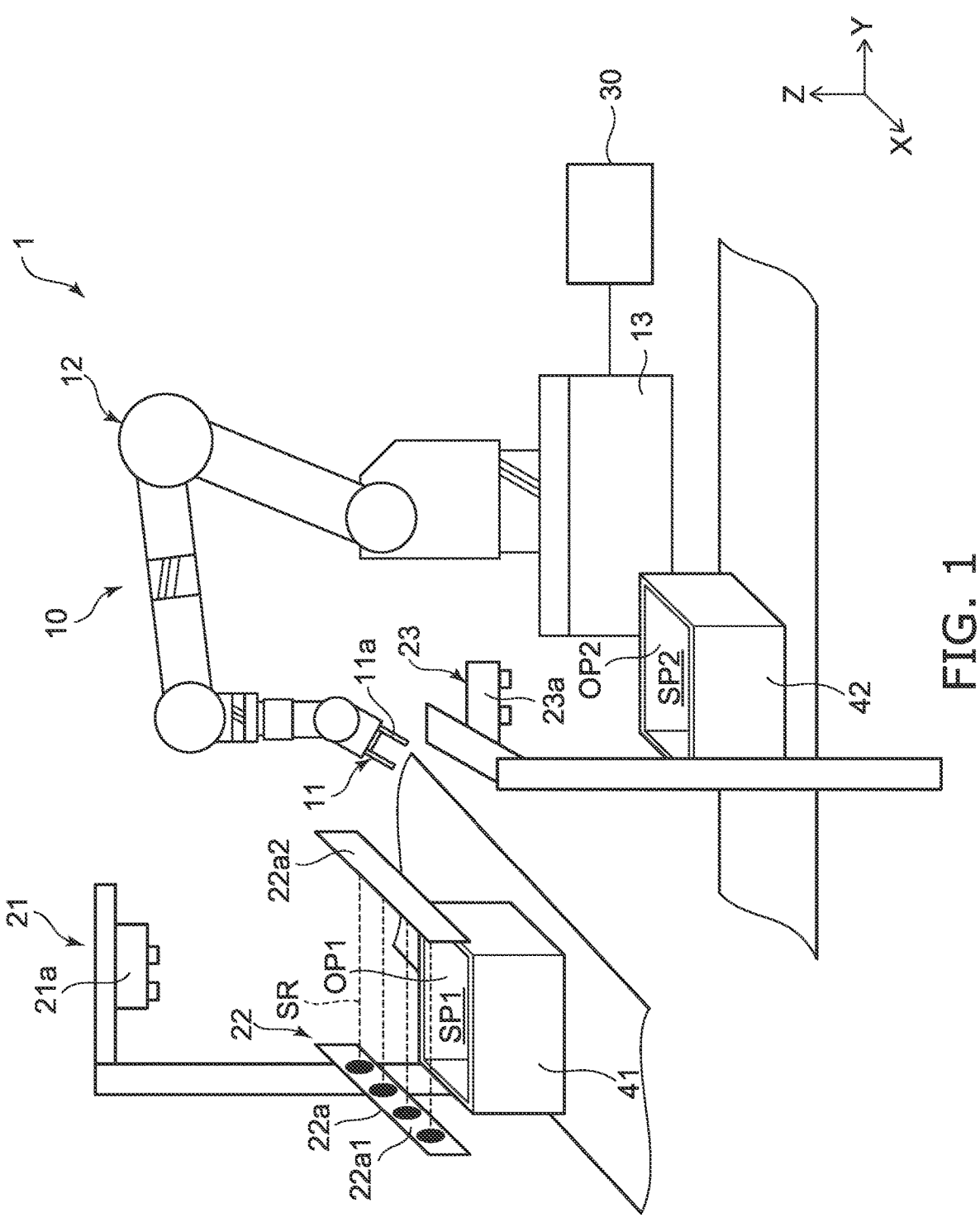
FIG. 1 is a schematic view showing a picking system according to an example.

According to one embodiment, a picking system includes a picking robot and a control device. The picking robot transfers an object from a first space to a second space by using a robot hand. The control device controls the picking robot. When a first measurement result related to a shape of the object in the first space when viewed along a first direction is acquired, the control device performs a first calculation of calculating a position candidate for placing the object in the second space based on the first measurement result. When a second measurement result related to a shape of the object when viewed along a second direction in an action of the robot hand on the object is acquired, the control device performs a second calculation of calculating a position of the robot hand when placing the object in the second space based on the second measurement result and the position candidate. The second direction crosses the first direction.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

FIG. 1 is a schematic view showing a picking system according to an example.

As shown in FIG. 1, the picking system 1 according to the example includes a picking robot 10, a first measuring instrument 21, a second measuring instrument 22, a third measuring instrument 23, and a control device 30.

Herein, an X-direction, a Y-direction (a second direction), and a Z-direction (a first direction) are used in the description of the embodiments. The X-direction and the Y-direction cross each other. The Z-direction crosses an X-Y plane (a first plane). For example, the X-direction and the Y-direction are parallel to a horizontal plane. The Z-direction is parallel to a vertical direction.

The picking robot 10 transfers an object placed in a first space SP1 inside a first container 41 to a second space SP2 inside a second container 42. More specifically, the first container 41 has a first opening OP1 facing the Z-direction. The second container 42 has a second opening OP2 facing the Z-direction. The picking robot 10 removes the object from the first container 41 via the first opening OP1 and moves the object into the second container 42 via the second opening OP2. The picking robot 10 includes a robot hand 11, a robot arm 12, and a housing 13.

The robot hand 11 holds (stably grips) the object. For example, the robot hand 11 holds the object by one of suction-gripping, pinching, or jamming. In the example of FIG. 1, the robot hand 11 includes multiple fingers 11a. The multiple fingers 11a hold the object by pinching the object. The robot hand 11 is mounted to the robot arm 12.

The robot arm 12 moves the robot hand 11. In the example shown in FIG. 1, the robot arm 12 is a vertical articulated robot that has six degrees of freedom; and the robot hand 11 is mounted to the tip of the robot arm 12. The robot arm 12 may be a horizontal articulated robot, a linear robot, an orthogonal robot, or a parallel link robot. The robot arm 12 may include a combination of at least two selected from a vertical articulated robot, a horizontal articulated robot, a linear robot, an orthogonal robot, and a parallel link robot. The robot arm 12 is mounted to the housing 13.

The housing 13 supports the robot arm 12 and is fixed to the floor surface. A power supply device for driving electric actuators such as motors, a cylinder, tank, and compressor for driving fluid actuators, various safety mechanisms, etc., may be housed in the housing 13. The control device 30 may be housed in the housing 13.

The first measuring instrument 21 measures the shape when viewed along the Z-direction of the object placed in the first space SP1. For example, the first measuring instrument 21 includes an imaging part 21a. The imaging part 21a is a camera including one or two selected from an image sensor and a distance sensor. The imaging part 21a images the object in the first space SP1 when viewed along the Z-direction and acquires an image (a still image). The imaging part 21a may acquire a video image and cut out a still image from the video image. The imaging part 21*a* transmits the image to the control device 30.

The control device 30 measures the shape of a first surface (the upper surface), which crosses the Z-direction, of the object based on the image. In the picking system 1, the imaging part 21*a* and the control device 30 function as the first measuring instrument 21. The measurement result (a first measurement result) of the first measuring instrument 21 includes first shape information related to the shape of the first surface of each object. An image processing device other than the control device 30 may be embedded in the imaging part 21*a* and used as the first measuring instrument 21.

The second measuring instrument 22 measures the shape when viewed along the Y-direction of the object while being acted on by the picking robot 10. For example, the second measuring instrument 22 includes a light curtain 22*a*. The light curtain 22*a* includes a light projector 22*a*1 and a light receiver 22*a*2. The light curtain 22*a* includes a sensing region SR facing the first opening OP1 when viewed along the Z-direction. The sensing region SR is a region that transmits the light emitted from the light projector 22*a*1. The light curtain 22*a* detects the object passing through the sensing region SR. The light curtain 22*a* transmits the detection result to the control device 30.

The control device 30 measures the shape of a second surface (the side surface), which crosses the Y-direction, of the object based on the Z-direction position of the light curtain 22*a*, the time at which the object passed through the sensing region SR, the Z-direction position of the robot hand 11 at the time, etc. In the picking system 1, the light curtain 22*a* and the control device function as the second measuring instrument 22. The measurement result (a second measurement result) of the second measuring instrument 22 includes second shape information related to the shape of the second surface. An arithmetic device other than the control device 30 may be included together with the light curtain 22*a* and may be used as the second measuring instrument 22.

Instead of the light curtain 22*a*, the second measuring instrument 22 may include an imaging part or a distance sensor such as a laser rangefinder, etc. The control device 30 measures the Z-direction length of the object based on an image or the measurement result of the distance sensor.

The third measuring instrument 23 measures the shape of the object placed in the second space SP2 when viewed along the Z-direction. For example, the third measuring instrument 23 includes an imaging part 23*a*. The imaging part 23*a* is a camera including one or two selected from an image sensor and a distance sensor. The imaging part 23*a* images the second space SP2 in the Z-direction and acquires an image (a still image). The imaging part 23*a* may acquire a video image and cut out a still image from the video image. The imaging part 23*a* transmits the image to the control device 30.

The control device 30 measures the shape of the object placed in the second space SP2 based on the image. In the picking system 1, the imaging part 23*a* and the control device 30 function as the third measuring instrument 23. The measurement result (a third measurement result) of the third measuring instrument 23 includes obstacle information related to the three-dimensional shape of the object placed in the second space SP2. An image processing device other than the control device 30 may be embedded in the imaging part 23*a* and used as the third measuring instrument 23.

In addition to the calculation described above, the control device 30 controls the picking robot 10. For example, the control device 30 moves the robot hand 11 and adjusts the posture of the robot hand 11 by operating the drive axes of the robot arm 12. Also, the control device 30 causes the robot hand 11 to hold the object and release the object.

Figure 2:
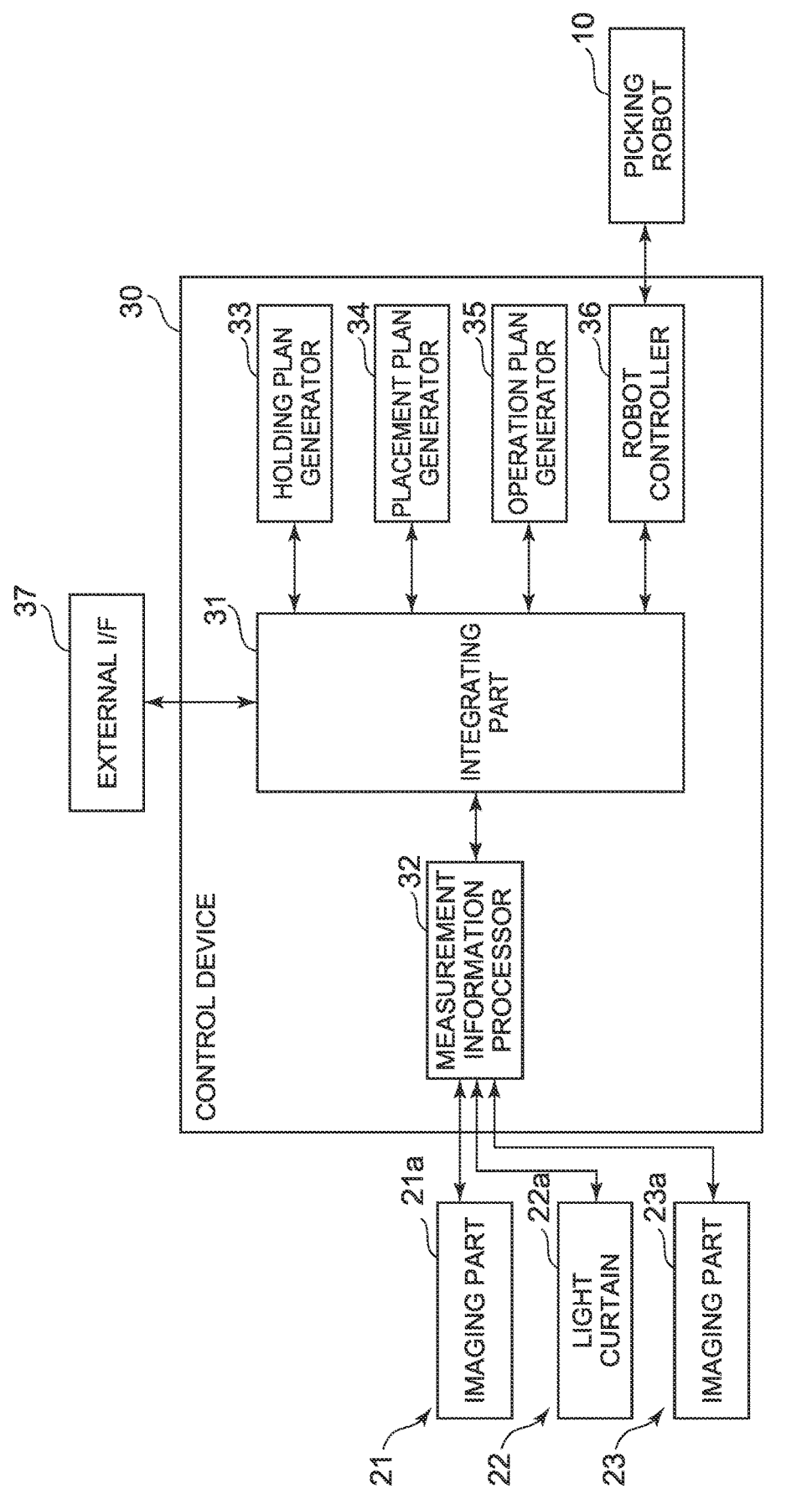
FIG. 2 is a block diagram schematically showing the functional configuration of the control device.

FIG. 2 is a block diagram schematically showing the functional configuration of the control device.

The control device 30 includes an integrating part 31, a measurement information processor 32, a holding plan generator 33, a placement plan generator 34, an operation plan generator 35, and a robot control device 36.

The integrating part 31 manages, implements, and causes the generation of task plans by the picking system 1 based on input information of the user from an external interface (I/F) 37, the input of a picking instruction from a higher-level system, the state of the picking system 1, etc.

The measurement information processor 32 controls the imaging part 21*a*, the light curtain 22*a*, and the imaging part 23*a*. The measurement information processor 32 processes information obtained from the imaging part 21*a*, the light curtain 22*a*, and the imaging part 23*a* and generates a motion plan and information necessary for operation control, error detection, etc. The motion plan includes an operation plan that relates to an operation of the picking robot 10. The measurement information processor 32 performs a portion of the functions as the first to third measuring instruments 21 to 23.

For example, the measurement information processor 32 segments the image that is imaged by the imaging part 21*a* and generates the first shape information by using the result of the segmentation. In the segmentation, the objects that are visible in the image are identified; and the image is subdivided into at least one region. Each region corresponds respectively to an object. The first shape information is related to the shape of the first surface of each object in the first container 41 and includes the segmentation result of the first surface, the X-direction length and the Y-direction length of the first surface of the object, the position of the first surface of the object in the X-Y plane, etc. The lengths and positions are calculated based on the segmentation result. For example, the actual length of each object is calculated based on the distance between the imaging part 21*a* and the object and the length (the number of pixels) in the X-direction or the Y-direction of the object in the image. Similarly, the position of the first surface of each object in the X-Y plane is calculated based on the position of the first surface in the image and the distance between the imaging part 21*a* and the object.

The measurement information processor 32 generates the second shape information based on the detection result of the light curtain 22*a*. The second shape information is related to the shape of at least a portion of the second surface of the object that is held. Specifically, the second shape information includes the Z-direction length (the height) of the at least a portion of the second surface.

FIGS. 3A to 3C are schematic views for describing the method for measuring the second measuring instrument.

The method for measuring the Z-direction length of the object will be described with reference to FIGS. 3A and 3B. The control device 30 records the angles of the joints of the robot arm 12 at a prescribed interval. Also, the light curtain 22*a* detects the existence or absence of a light-shielding object between the light projector 22*a*1 and the light receiver 22*a*2 at a prescribed interval.

As shown in FIG. 3A, when the picking robot 10 holds an object, at least a portion of light L emitted from the light projector 22*a*1 is obstructed by the robot hand 11 or the robot arm 12 and is not incident on the light receiver 22*a*2. As the picking robot 10 raises the object, the light L becomes incident on the light receiver 22a2 when one Z-direction end (the lower end) of the object passes through the sensing region SR as shown in FIGS. 3B and 3C.

The light curtain 22a records a second time t2 at which the light L that had been obstructed is first detected by the light receiver 22a2. The control device 30 calculates a first position z1 in the Z-direction of the robot hand 11 at a first time t1 directly before the second time t2 based on the angles of the joints of the robot arm 12 at the first time t1. For example, the position of the tool center point (TCP) of the robot hand 11 is calculated as the position of the robot hand 11. The control device 30 calculates a second position z2 in the Z-direction of the robot hand 11 at the second time t2 based on the angles of the joints of the robot arm 12 at the second time t2. The control device 30 estimates (z2+z1)/2 to be a position zH of the robot hand 11 when the object passed through the sensing region SR of the light curtain 22a. The control device 30 refers to a position zL in the Z-direction at which the light curtain 22a is located. The position zL of the light curtain 22a is preregistered. The control device 30 calculates zH−zL as a height SZ of the object.

As shown in FIG. 3C, the area measured by the second measuring instrument 22 may not be the entire measured surface of the object. It is sufficient for the second measuring instrument 22 to be able to measure the length (the distance) between the TCP and the lower end of the object. In other words, the length is the protrusion amount of the object from the tip of the robot hand 11. The length may be calculated using a reference other than the TCP. For example, when a control point is set at the tip of the robot arm 12, the length is calculated using the control point as a reference. In the case of a point mechanically fixed with respect to a portion of the robot arm 12, the length can be measured using the point as a reference. Also, according to the configuration of the robot hand 11, the protrusion amount that is measured by the second measuring instrument 22 may be equal to the actual Z-direction length of the object. For example, when the robot hand 11 holds only the upper surface of the object by suction-gripping, the Z-direction length of the entire object may be calculated as the protrusion amount.

The measurement information processor 32 generates obstacle information based on the image that is imaged by the imaging part 23a. The obstacle information includes the position in the X-Y plane of each object in the second space SP2, the Z-direction position of the upper surface of each object, etc.

The holding plan generator 33 generates a holding plan. The holding plan includes the holding method of the object, the holding position of the robot arm 12 when holding the object, the holding posture, the via-point until reaching the holding position, etc.

The placement plan generator 34 generates a placement plan. The placement plan includes the placement position of the robot arm 12 when releasing the held object into the second container 42, the placement posture, the via-point until reaching the placement position, etc.

The operation plan generator 35 generates operation information of the robot arm 12. The operation information includes information related to a holding operation, a transfer operation, and a placement operation. The holding operation is the operation of the tip of the robot arm 12 from above the holding position until reaching the holding position and the holding posture. The transfer operation is the operation of the tip of the robot arm 12 from above the holding position until being above the placement position. The placement operation is the operation of the tip of the robot arm 12 from above the placement position until reaching the placement position and the placement posture.

The robot control device 36 controls the picking system 1 including the picking robot 10 according to the information generated by the holding plan generator 33, the placement plan generator 34, or the operation plan generator 35, the operation switching instructions from the integrating part 31, etc.

The external I/F 37 inputs and outputs data between the integrating part 31 (the control device 30) and the external device (not illustrated).

Figure 4:
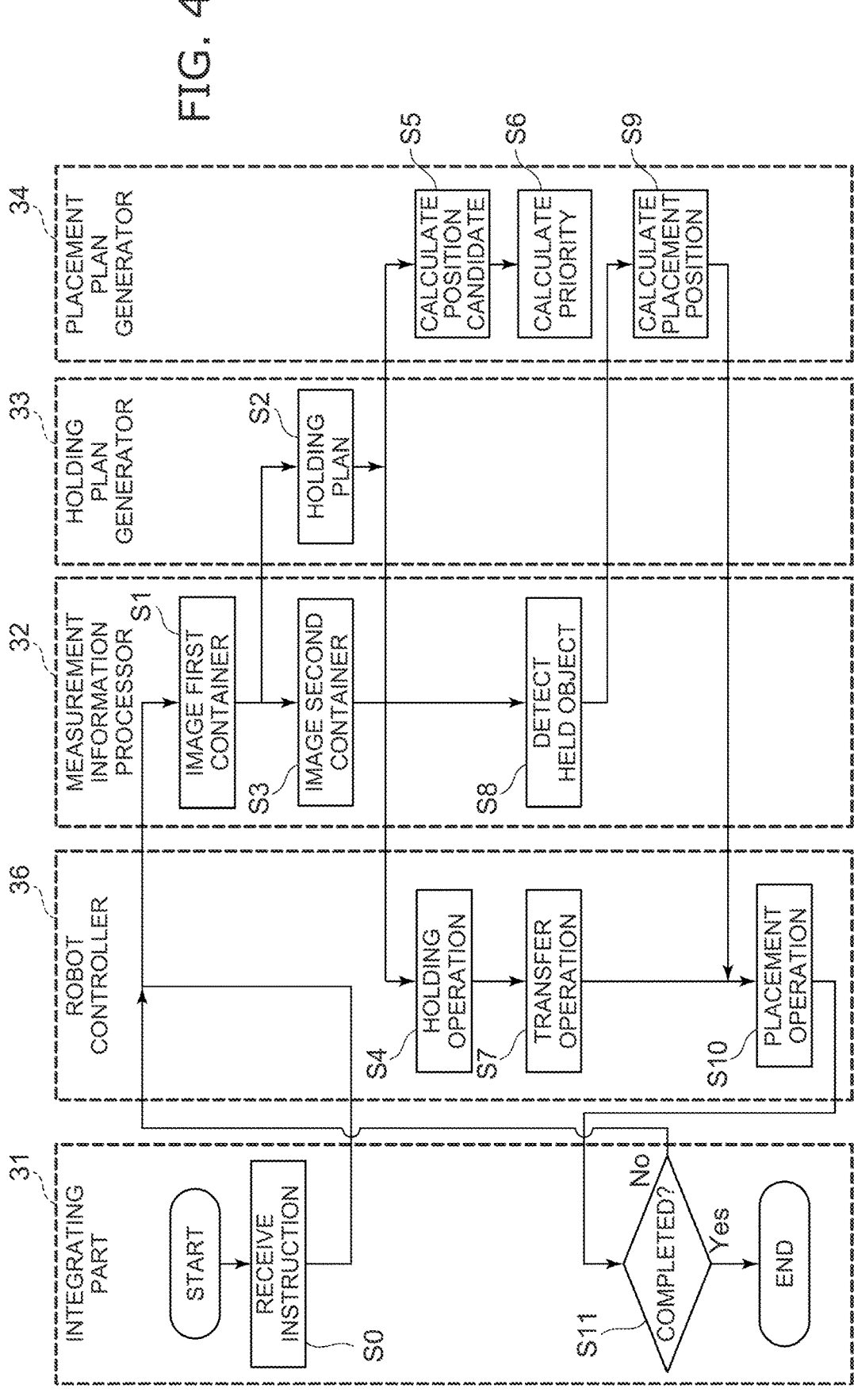
FIG. 4 is a schematic view showing a processing procedure of the picking system according to the embodiment.

FIG. 4 is a schematic view showing a processing procedure of the picking system according to the embodiment.

The integrating part 31 receives a picking instruction from the external I/F 37 (step S0). For example, the picking instruction is transmitted from a higher-level host computer. The integrating part 31 instructs the measurement information processor 32 to image the first container 41. The measurement information processor 32 causes the imaging part 21a to image the interior of the first container 41 (step S1) and generates the first shape information. After the imaging of the first container 41, the holding plan generator 33 generates a holding plan (step S2). In parallel, the measurement information processor 32 causes the imaging part 23a to image the interior of the second container 42 (step S3) and generates the obstacle information.

After the generation of the holding plan by the holding plan generator 33 is completed, the robot control device 36 performs a holding operation based on the generated holding plan (step S4). In parallel, the placement plan generator 34 calculates a position candidate for placing the object to be transferred in the second space SP2 based on the holding plan and the imaging result of the second container 42 (step S5). The placement plan generator 34 calculates the priority of the position candidate (step S6). The placement plan generator 34 stores the calculated position candidate and priority. After completing the holding operation, the robot control device 36 performs a transfer operation (step S7). In the transfer operation, the object that is held is lifted and transferred to the second container 42. In the transfer operation, the measurement information processor 32 causes the light curtain 22a to detect the object that is held (step S8) and generates the second shape information.

The placement plan generator 34 calculates the position of the robot hand 11 when placing the object in the second container 42 based on the second shape information and the position candidate (step S9). Herein, the position of the robot hand 11 when placing the object in the second container 42 is called the "hand position". After calculating the hand position, the robot control device 36 performs a placement operation (step S10). After completing the placement operation, it is determined whether or not the instructed quantity of objects have been transferred (step S11). Steps S1 to S10 are repeated until the instructed quantity of objects are transferred.

Figure 5:
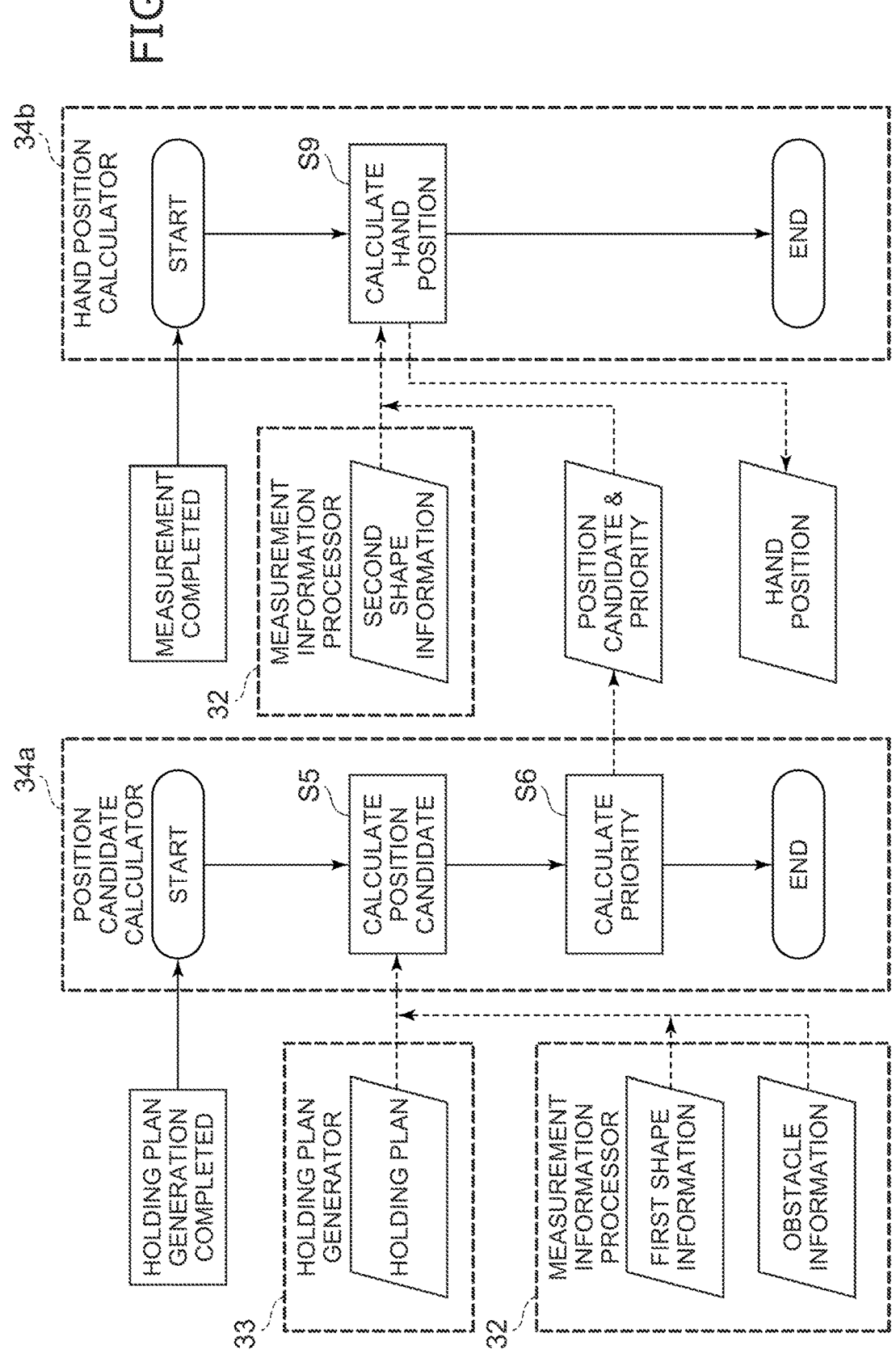
FIG. 5 is a flowchart showing processing by the placement plan generator.

FIG. 5 is a flowchart showing processing by the placement plan generator.

The placement plan generator 34 includes a position candidate calculator 34a and a hand position calculator 34b. The position candidate calculator 34a starts processing when the generation of the holding plan is completed. The position candidate calculator 34a calculates the position candidate inside the second container 42 of the object based on the first shape information, the obstacle information, and the holding plan (step S5). The position candidate is a candidate of the position of the transferred object when placed in the second container 42. Continuing, the position candidate calculator 34*a* calculates the priority of each position candidate (step S6). The position candidate calculator 34*a* stores the position candidate and the priority inside the placement plan generator 34.

The hand position calculator 34*b* starts processing when the measurement of the object by the second measuring instrument 22 is completed. The hand position calculator 34*b* calculates the hand position of the object by using the position candidate calculated by the position candidate calculator 34*a* and the second shape information obtained by the second measuring instrument 22 (step S9). Also, when calculating the hand position, the position of the robot hand 11 corresponding to the hand position is calculated. Subsequently, the operation plan generator 35 generates operation information based on the calculated position of the robot hand 11. A placement operation is performed based on the operation information.

Figure 6:
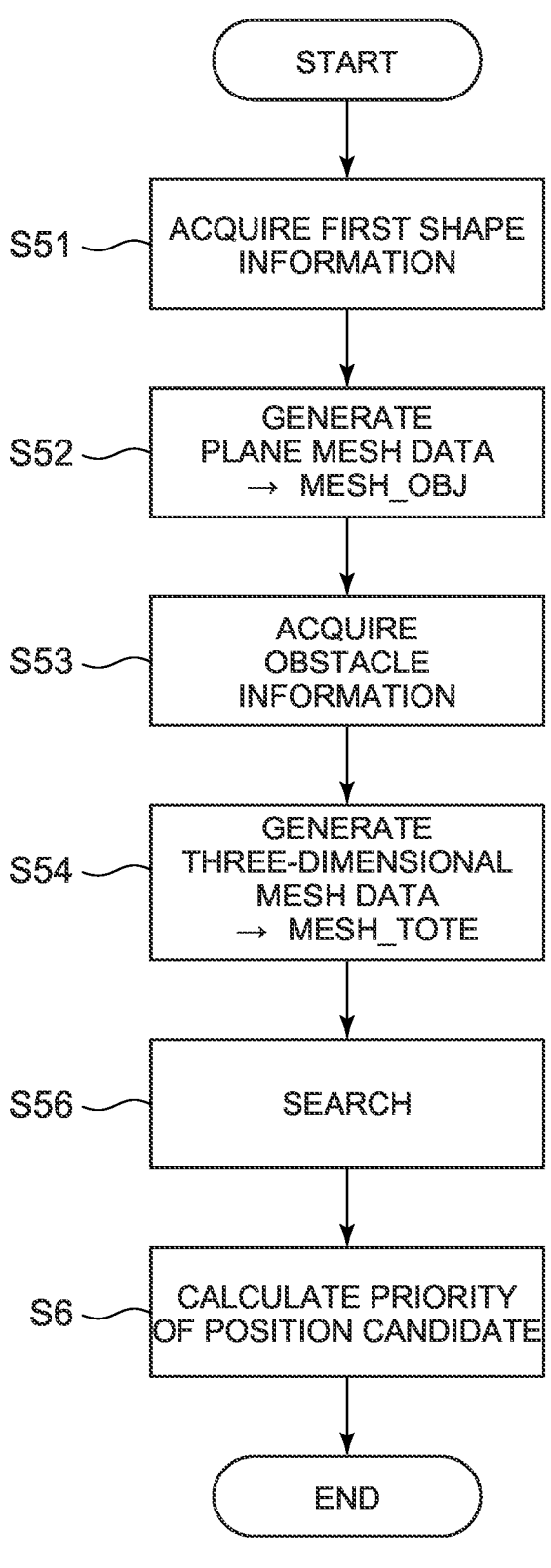
FIG. 6 is a flowchart showing calculation processing of the position candidate calculator.

FIG. 6 is a flowchart showing calculation processing of the position candidate calculator.

The calculation processing (a first calculation, etc.) of the position candidate calculator 34*a* for calculating the position candidate will be described with reference to FIG. 6. First, the first shape information of the transferred object is acquired (step S51). More specifically, the segmentation result and the size in the X-Y plane included in the first shape information are acquired. Plane mesh data is generated using the segmentation result (step S52). The mesh data is generated by partitioning a portion of the image subdivided by the segmentation into a lattice shape. The generated plane mesh data is stored as "MESH_OBJ". The plane mesh data indicates the shape in the X-Y plane of the first surface of the transferred object.

The obstacle information is acquired (step S53). Three-dimensional mesh data that indicates the shape of the obstacle in the second space SP2 is generated using the obstacle information (step S54). The generated three-dimensional mesh data is stored as "MESH_TOTE".

The candidate of the position at which the held object will be placed is searched using the plane mesh data and the three-dimensional mesh data (step S56). For example, a grid search, a binary search tree, or a Monte Carlo Tree Search (MCTS) is used as the search method. Normally, multiple position candidates are obtained unless many objects are to be placed in the second container 42, the second container 42 is excessively small, etc. Favorably, all positions at which placement is possible are calculated as the position candidates. To reduce the calculation time of the position candidates, the number of position candidates to be calculated may be pre-specified. In such a case, the position candidate calculator 34*a* ends the search when the specified number of position candidates are calculated.

The priority of each position candidate is calculated (step S6). The position candidate calculator 34*a* stores the position candidate and the priority.

Figure 7:
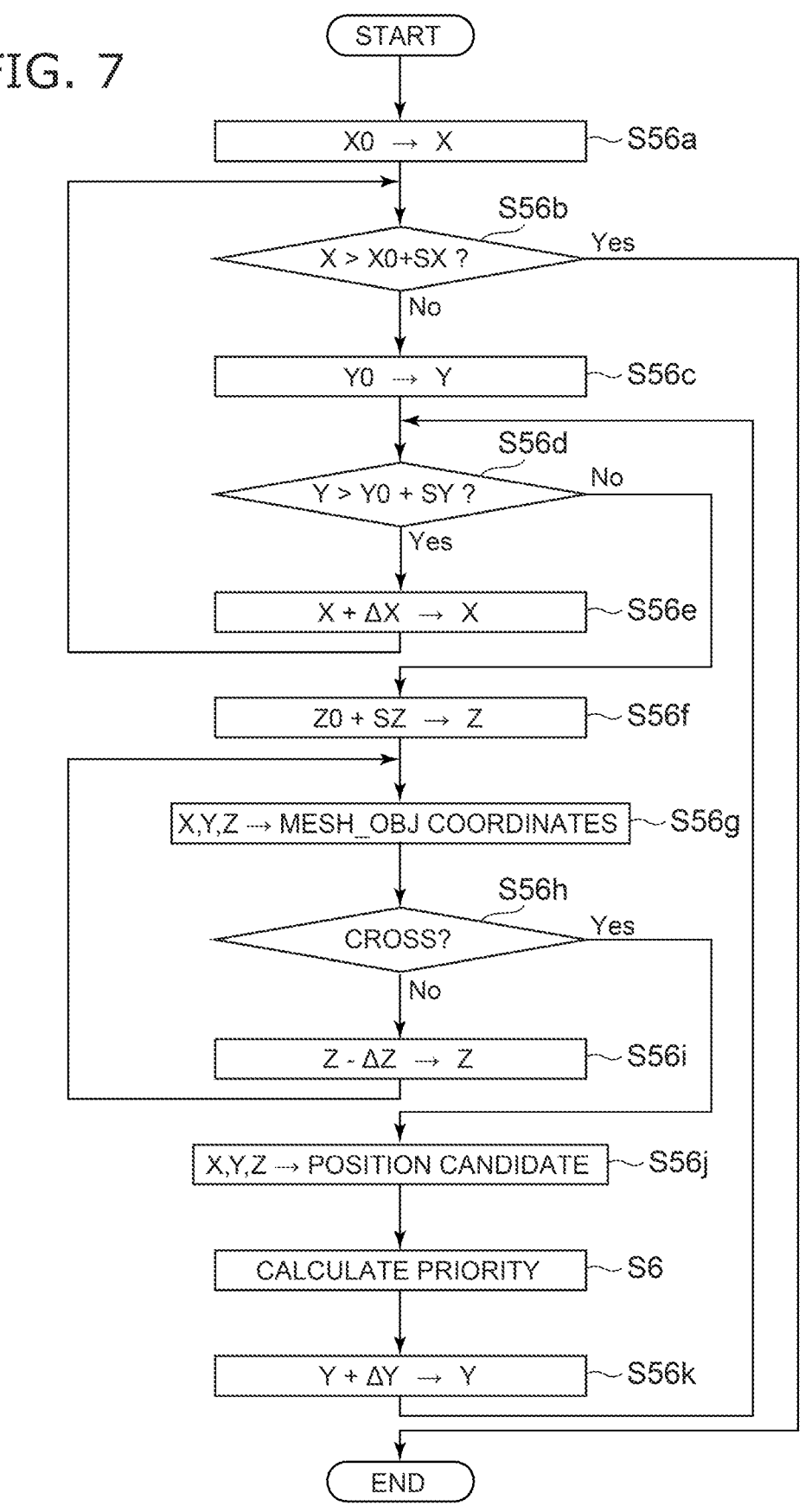
FIG. 7 is a flowchart showing the search method of the position candidate of the position candidate calculator.

FIG. 7 is a flowchart showing the search method of the position candidate of the position candidate calculator.

In FIG. 7, X0 is the origin coordinate of the second container 42 in the X-direction. Y0 is the origin coordinate of the second container 42 in the Y-direction. Z0 is the origin coordinate of the second container 42 in the Z-direction. For example, the Z-direction position of the bottom surface of the second container 42 is set as Z0. For example, one of the four corners of the second container 42 is set as the origin position in the X-Y plane. The bottom surface of the second container 42 is set as the origin position in the Z-direction. SX is the length of the second container 42 in the X-direction. SY is the length of the second container 42 in the Y-direction. SZ is the length of the second container 42 in the Z-direction. SX, SY, and SZ are preset.

First, X0 is substituted in the variable X (step S56*a*). It is determined whether or not the variable X is greater than X0+SX (step S56*b*). In other words, it is determined whether or not the searched X-coordinate is positioned outside the second container 42. When the variable X is greater than X0+SX, the search ends. When the variable X is not greater than X0+SX, Y0 is substituted in the variable Y (step S56*c*). It is determined whether or not the variable Y is greater than Y0+SY (step S56*d*). In other words, it is determined whether or not the searched Y-coordinate is positioned outside the second container 42. When the variable Y is greater than Y0+SY, the value of ΔX added to the current variable X is substituted in the variable X (step S56*e*). Step S56*b* is re-performed. In other words, the searched X-coordinate is slightly shifted in the X-direction.

When the variable Y is not greater than Y0+SY in step S56*d*, Z0+SZ is substituted in the variable Z (step S56*f*). The variable X, the variable Y, and the variable Z at the timing of the completion of step S56*f* are set as the MESH_OBJ coordinate (X, Y, Z) (step S56*g*). MESH_OBJ is the plane mesh data of the transferred object. It is determined whether or not the MESH_OBJ coordinate (X, Y, Z) crosses MESH_TOTE (step S56*h*). MESH_TOTE is the three-dimensional mesh data inside the second container 42. In step S56*h*, it is determined whether or not the bottom surface of the object will contact an obstacle (another object or the bottom surface or side surface of the second container 42) when placing the object at the coordinate (X, Y, Z).

When the coordinate (X, Y, Z) does not cross MESH_TOTE, the value of ΔZ subtracted from the current variable Z is substituted in the variable Z (step S56*i*). Step S56*g* is re-performed. In other words, the lowering of the Z-direction position is repeated until the bottom surface of the placed object contacts an obstacle. When the coordinate (X, Y, Z) crosses MESH_TOTE, that coordinate (X, Y, Z) is stored as a position candidate (step S56*j*). The priority of the stored position candidate is calculated (step S6). When the priority is calculated, the value of ΔY added to the current variable Y is substituted in the variable Y (step S56*k*). Subsequently, step S56*d* is re-performed.

The method for calculating the priority can be arbitrarily set according to the placement reference that is considered important. As an example, the objects are preferentially placed from the bottom surface or corners of the second container 42. In such a case, a score Sc that indicates the priority is calculated by the following Formula 1. In the formula, a, b, and c are weighting factors. X, Y, and Z are coordinates of the position candidate respectively in the X-direction, the Y-direction, and the Z-direction. X0 and Y0 are the coordinates in the X-Y plane of the preferential placement corner. X1 and Y1 are coordinates in the X-Y plane of the corner positioned diagonal to the corner at the coordinate (X0, Y0). The priority increases as the score Sc increases.

$$Sc = a(1 - |X - X0| / |X1 - X0|) + b(1 - |Y - Y0| / |Y1 - Y0|) + c(1 - |Z - Z0| / |Z1 - Z0|)$$ [Formula 1]

In the example shown in FIG. 7, the priority is calculated each time the position candidate is calculated. The priorities may be calculated for multiple position candidates after the position candidates are calculated.

Figure 8:
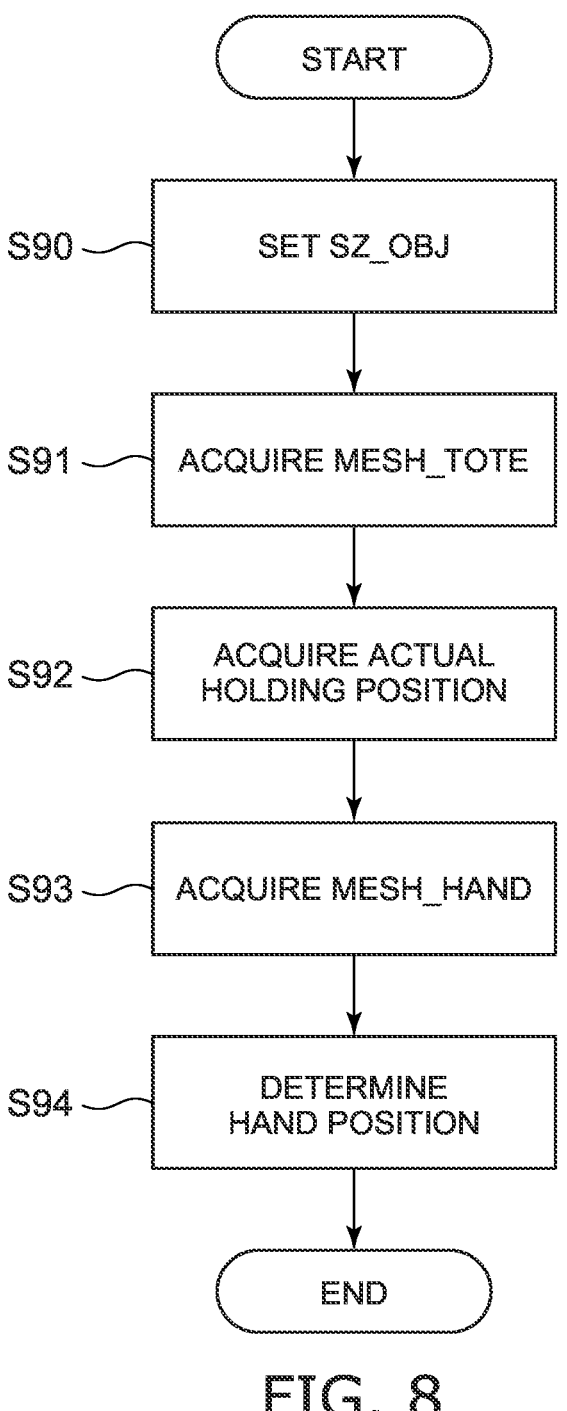
FIG. 8 is a flowchart showing the general concept of the processing of the hand position calculator.

FIG. 8 is a flowchart showing the general concept of the processing of the hand position calculator.

The calculation processing (a second calculation, etc.) of the hand position calculator 34*b* for calculating the hand position will be described with reference to FIG. 8. First, the second shape information is acquired, and the protrusion amount (SZ_OBJ) in the Z-direction of the object is set (step S90). The three-dimensional mesh data "MESH_TOTE" that indicates the obstacle information inside the second container 42 is acquired (step S91). As MESH_TOTE, the three-dimensional mesh data that is generated by the position candidate calculator 34*a* may be utilized, or three-dimensional mesh data may be newly generated.

The actual holding position of the object by the robot hand 11 is acquired from the holding result (step S92). The shape of the hand is acquired as mesh data "MESH_HAND" (step S93). The acquired mesh data is referenced to the actual holding position of the object by the robot hand 11. For example, the mesh data "MESH_HAND" is prepared beforehand. The mesh data "MESH_HAND" may be generated based on the image acquired by the imaging part 21*a*. The hand position is determined using the mesh data "MESH_HAND", the three-dimensional mesh data "MESH_TOTE", SZ_OBJ, and the position candidate calculated by the position candidate calculator 34*a* (step S94).

Figure 9:
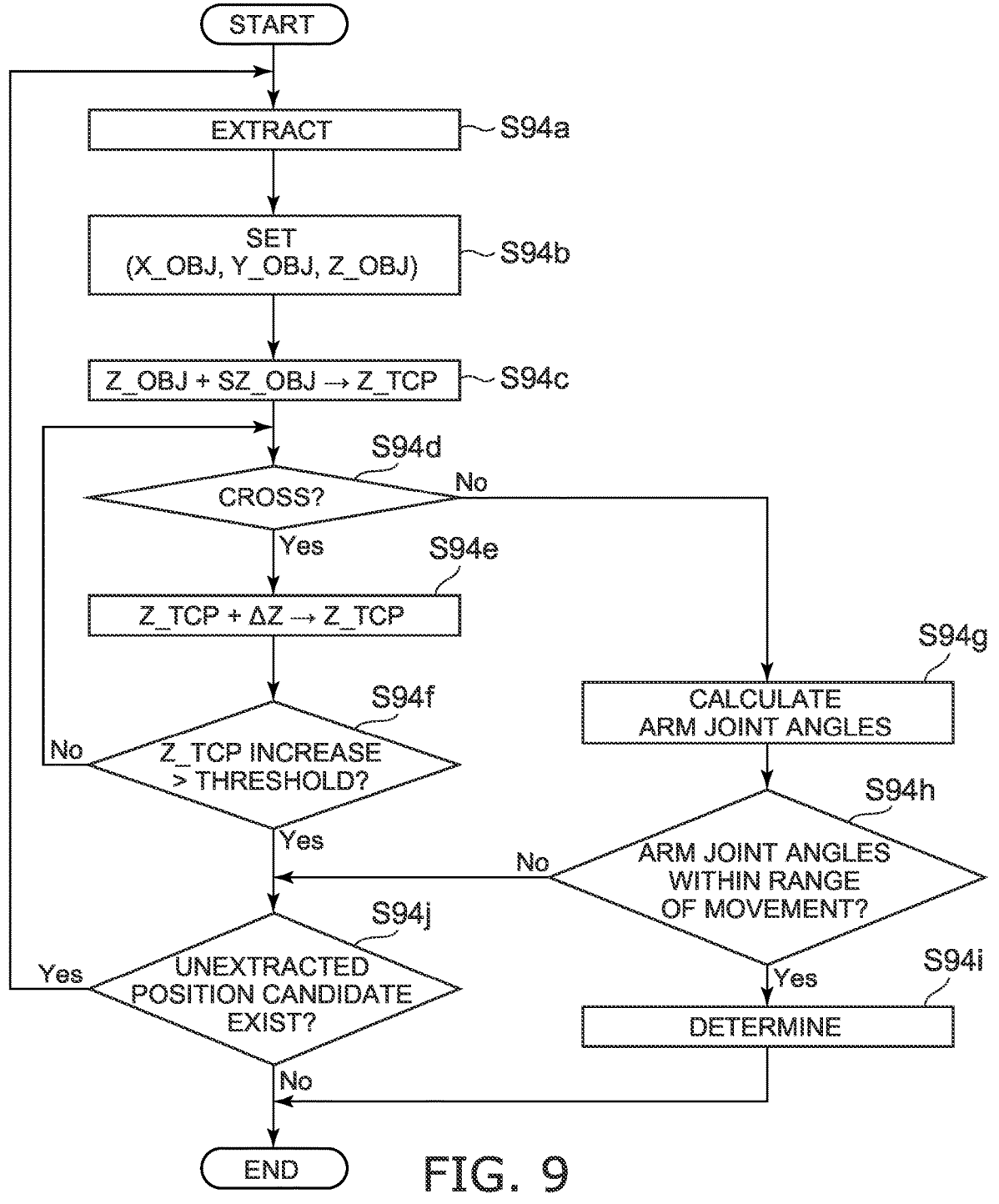
FIG. 9 is a flowchart showing processing of the hand position calculator.

FIG. 9 is a flowchart showing processing of the hand position calculator.

Details of step S94 of the flowchart shown in FIG. 8 will be described with reference to FIG. 9. First, one position candidate among at least one position candidate calculated by the position candidate calculator 34*a* is extracted (step S94*a*). In step S94*a*, the position candidate is extracted in order of decreasing priority. The extracted position candidate is set as the coordinate (X_OBJ, Y_OBJ, Z_OBJ) of the bottom surface of the transferred object (step S94*b*).

An example of the specific method for setting the coordinate (X_OBJ, Y_OBJ, Z_OBJ) will now be described. The actual holding position of the robot hand 11 in the X-Y plane acquired in step S92 is taken as (X_GTCP, Y_GTCP). The coordinate of the object in the first container 41 is taken as (X_GOBJ, Y_GOBJ). In such a case, the relative position of the holding position of the robot hand 11 and the position of the object is (X_REL, Y_REL)=(X_GOBJ-X_GTCP, Y_GOBJ-Y_GTCP). When the position candidate of the object is (X_C, Y_C, Z_C), the hand position candidate for placement considering the relative position is (X_OBJ, Y_OBJ, Z_OBJ)=(X_C-X_REL, Y_C-Y_REL, Z_C).

The value of the protrusion amount SZ_OBJ in the Z-direction of the object added to the Z-coordinate Z_OBJ of the bottom surface is set as "Z_TCP" (step S94*c*). Z_TCP is the Z-direction position of the TCP of the robot hand 11. It is determined whether or not MESH_HAND crosses MESH_TOTE when MESH_HAND is placed on the coordinate (X_OBJ, Y_OBJ, Z_TCP) (step S94*d*).

When MESH_HAND crosses MESH_TOTE, the value of ΔZ added to Z_TCP is set as the new Z_TCP (step S94*e*). It is determined whether or not the raise amount of the new Z_TCP for Z_TCP set in step S94*c* is greater than a threshold (step S94*f*). The object falls from a higher position as the addition of ΔZ is repeated. A height from which the object can fall without damage is set as the threshold. When the raise amount is not greater than the threshold, step S94*d* is re-performed using the new Z_TCP.

When MESH_HAND does not cross MESH_TOTE in step S94*d*, the angles of the joints of the robot arm 12 corresponding to Z_TCP are calculated by inverse kinematics (step S94*g*). It is determined whether or not the angles of the joints are within the range of movement (step S94*h*). When the angles of the joints are within the range of movement, (X_OBJ, Y_OBJ, Z_TCP) is determined as the hand position (step S94*i*), and the select processing ends.

When the raise amount is greater than the threshold in step S94*f* or when the angles of the joints are outside the range of movement in step S94*h*, it is determined whether or not an unextracted position candidate exists (step S94*j*). When an unextracted position candidate exists, the processing is re-performed for another position candidate. When another position candidate does not exist, the calculation processing of the hand position ends. This means that the object cannot be placed in the second container 42.

Advantages of the embodiment will now be described.

In the picking task of a robot, it is desirable to reduce impacts when transferring so that the object is not damaged. To reduce impacts when transferring, it is favorable to acquire the size (the three-dimensional shape) of the object in the X-direction, the Y-direction, and the Z-direction. Based on the acquired three-dimensional shape, the object can be placed in the second space SP2 of the transfer destination without colliding with surrounding obstacles. In particular, by accurately acquiring the size in the Z-direction of the object, contact with obstacles when transferring the object or falling when the object is released can be prevented, and the impacts to the object can be reduced.

When multiple objects are placed in the first container 41 of the transfer origin, it is difficult to acquire accurate three-dimensional shapes based on the measurement result of the first measuring instrument 21. For example, the Z-direction length of one object cannot be measured when a portion of the one object is hidden by another object. A method for acquiring the three-dimensional shape of the transferred object may be considered in which the object is measured after the robot hand 11 acts on the object. The three-dimensional shape of the object can be acquired by the action of the robot hand 11 exposing the hidden portion of the object. On the other hand, the calculation of the hand position by using the three-dimensional shape is computation-intensive and requires time. If the calculation time after the action of the robot hand 11 on the object is long, it is necessary to stop the picking robot 10 until the calculation result is obtained. Therefore, the time of the picking task lengthens, and the work efficiency decreases.

In the picking system 1 according to the embodiment, the first calculation of calculating the position candidate of the transferred object is performed when the first measurement result of the first measuring instrument 21 is obtained. The position candidate is calculated based on the first measurement result from the first measuring instrument 21 and is a candidate of the position of the object in the second space SP2. As described above, it is difficult for the first measuring instrument 21 to accurately measure the Z-direction length of the transferred object. However, even when the placement position of the final object cannot be calculated, the first measurement result makes it possible to calculate candidates of positions at which the object can be placed. In other words, the first calculation can be started before acquiring the second measurement result from the second measuring instrument 22. Continuing, when the second measurement result is obtained in the picking system 1, the position of the robot hand 11 when placing the object in the second space SP2 is calculated based on the second measurement result and the position candidate. In other words, the second calculation is started after the first calculation and after acquiring the second measurement result. In the second calculation, the hand position can be quickly calculated because the position candidates that are used are already calculated.

According to the picking system 1, compared to when the calculations of the hand position and the placement position of the object are started after the three-dimensional shape is obtained, the hand position can be calculated at an earlier timing. Therefore, the time that the picking robot 10 is stopped while calculating the hand position can be reduced. For example, the hand position can be calculated without stopping the picking robot 10. As a result, the time of the picking task can be reduced, and the work efficiency can be increased. Because the hand position can be calculated based on the three-dimensional shape of the object, the contact of the object with obstacles when transferring or the object dropping when released can be prevented, and impacts to the object can be reduced. Because the three-dimensional shape of the object is measured by the first and second measuring instruments 21 and 22, it is unnecessary to prepare a three-dimensional model of the object, etc., beforehand.

According to the embodiment, the time of the picking task can be reduced while reducing impacts to the object when transferring.

An example is described above in which the Z-direction is parallel to the vertical direction; and the X-direction and the Y-direction are parallel to a horizontal plane. Embodiments are not limited to such an example. For example, the Y-direction may be parallel to the vertical direction; and the X-direction and the Z-direction may be parallel to a horizontal plane. In any case, the shape of the object is measured from different directions by the first and second measuring instruments 21 and 22. The first calculation is performed after the measurement by the first measuring instrument 21 and before the measurement by the second measuring instrument 22; and the second calculation is performed after the measurement by the second measuring instrument 22. Thereby, the time of the picking task can be reduced while reducing impacts to the object when transferring.

Figure 10:
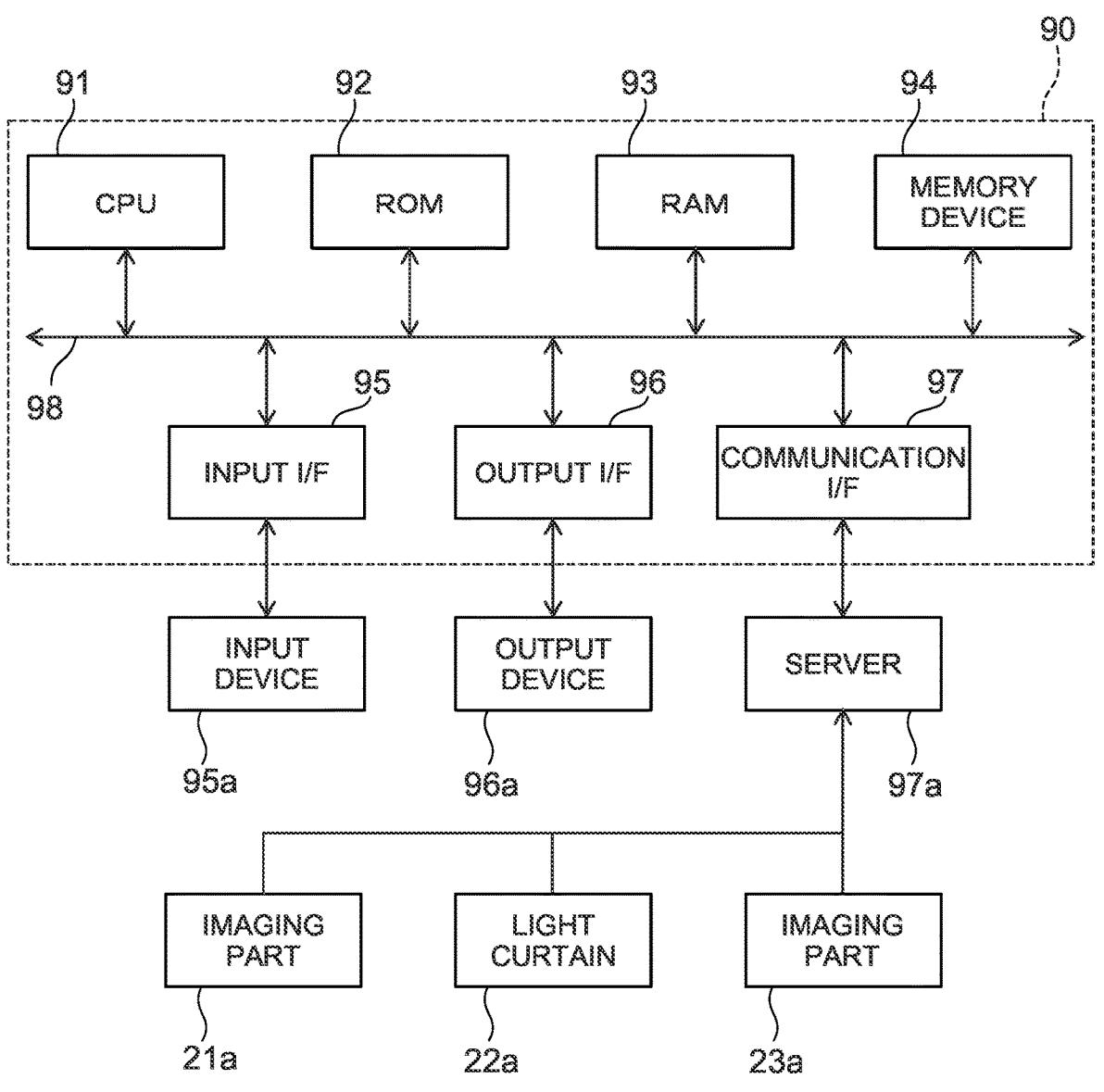
FIG. 10 is a schematic view showing a hardware configuration.

FIG. 10 is a schematic view showing a hardware configuration.

The control device 30 includes, for example, the hardware configuration shown in FIG. 10. A processing device 90 shown in FIG. 10 includes a CPU 91, ROM 92, RAM 93, a memory device 94, an input interface 95, an output interface 96, and a communication interface 97.

The ROM 92 stores programs that control the operations of a computer. Programs that are necessary for causing the computer to realize the processing described above are stored in the ROM 92. The RAM 93 functions as a memory region into which the programs stored in the ROM 92 are loaded.

The CPU 91 includes a processing circuit. The CPU 91 uses the RAM 93 as work memory to execute the programs stored in at least one of the ROM 92 or the memory device 94. When executing the programs, the CPU 91 executes various processing by controlling configurations via a system bus 98.

The memory device 94 stores data necessary for executing the programs and/or data obtained by executing the programs.

The input interface (I/F) 95 connects the processing device 90 and an input device 95a. The input I/F 95 is, for example, a serial bus interface such as USB, etc. The CPU 91 can read various data from the input device 95a via the input I/F 95.

The output interface (I/F) 96 connects the processing device 90 and an output device 96a. The output I/F 96 is, for example, an image output interface such as Digital Visual Interface (DVI), High-Definition Multimedia Interface (HDMI (registered trademark)), etc. The CPU 91 can transmit data to the output device 96a via the output I/F 96 and cause the output device 96a to display an image.

The communication interface (I/F) 97 connects the processing device 90 and a server 97a outside the processing device 90. The communication I/F 97 is, for example, a network card such as a LAN card, etc. The CPU 91 can read various data from the server 97a via the communication I/F 97. The images from the imaging parts 21a and 23a and the detection result from the light curtain 22a are stored in the server 97a.

The memory device 94 includes at least one selected from a hard disk drive (HDD) and a solid state drive (SSD). The input device 95a includes at least one selected from a mouse, a keyboard, a microphone (audio input), and a touchpad. The output device 96a includes at least one selected from a monitor and a projector. A device such as a touch panel that functions as both the input device 95a and the output device 96a may be used.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or another non-transitory computer-readable storage medium.

For example, the information that is recorded in the recording medium can be read by the computer (or an embedded system). The recording format (the storage format) of the recording medium is arbitrary. For example, the computer reads the program from the recording medium and causes a CPU to execute the instructions recited in the program based on the program. In the computer, the acquisition (or the reading) of the program may be performed via a network.

According to the embodiments described above, a picking system, a control device, a picking method, a program, and a storage medium are provided in which the time of the picking task can be reduced while reducing impacts to the object when transferring.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A picking system, comprising:

a picking robot configured to transfer an object from a first space to a second space by using a robot hand;

a first measuring instrument configured to measure a shape of the object from above to acquire a first measurement result, the first measurement result being acquired when the object is placed in the first space;

a second measuring instrument configured to measure a shape of the object from a side of the object to acquire a second measurement result, the second measurement result being acquired while the robot hand raises the object from the first space; and a control device configured to control the picking robot, wherein the control device is configured to acquire the first measurement result from the first measuring instrument, perform a first calculation, based on the first measurement result, to calculate position candidates of the object in the second space in three directions that are not all parallel, the first calculation including shifting a position for placing the object in the second space in each of the three directions, and determining, using the first measurement result, whether the object contacts another object at each shifted position for placing the object in the second space, acquire the second measurement result from the second measuring instrument, and perform a second calculation, based on the second measurement result and a position candidate among the position candidates, to calculate a position of the robot hand for placing the object in the second space, the second calculation including determining, from the second measurement result, a protrusion amount of the object, and adding the protrusion amount to the position candidate to obtain the position of the robot hand for placing the object in the second space.

2. The system according to claim 1, wherein the second measuring instrument is configured to measure the shape of the object while the object is held by the picking robot.

3. The system according to claim 1, wherein the first measuring instrument is configured to measure a shape of an upper surface of the object.

4. The system according to claim 3, wherein the first measuring instrument is configured to measure the shape of the object of the upper surface by segmenting a region of the object based on an image of the first space.

5. The system according to claim 1, wherein the second measuring instrument is configured to measure the protrusion amount in a vertical direction of the object from a tip of the robot hand.

6. The system according to claim 5, wherein the second measuring instrument includes a sensing region spreading horizontally, and the second measuring instrument is configured to measure the protrusion amount based on a time at which the object passes through the sensing region while the object is moved above by the picking robot.

7. The system according to claim 6, wherein the second measuring instrument is configured to measure the protrusion amount based on a position in the vertical direction of the sensing region and a position in the vertical direction of the robot hand at the time.

8. The system according to claim 1, further comprising: a third measuring instrument configured to measure a shape of the second space, in the first calculation, the control device being configured to calculate the position candidate based on the first measurement result and a third measurement result from the third measuring instrument.

9. The system according to claim 8, wherein the third measuring instrument is configured to measure a shape of an obstacle in the second space, and the control device is configured to:

calculate the position candidates in the first calculation based on the shape of the object and the shape of the obstacle; and calculate the position of the robot hand in the second calculation based on the shape of the object, the shape of the obstacle, and one of the position candidates.

10. The system according to claim 1, wherein the control device is configured to:

calculate the position of the robot hand in the second calculation by using one of the position candidates and the protrusion amount in a vertical direction of the object indicated by the second measurement result.

11. A control device configured to control a picking robot, the picking robot configured to transfer an object from a first space to a second space by using a robot hand, the control device being configured to:

receive a first measurement result from a first measuring instrument, the first measuring instrument being configured to measure a shape of the object from above to acquire the first measurement result, the first measurement result being acquired when the object is placed in the first space;

receive a second measurement result from a second measuring instrument, the second measuring instrument being configured to measure a shape of the object from a side of the object to acquire the second measurement result, the second measurement result being acquired while the robot hand raises the object from the first space;

perform a first calculation, based on the first measurement result, to calculate position candidates of the object in the second space in three directions that are not all parallel, the first calculation including shifting a position for placing the object in the second space in each of the three directions, and determining, using the first measurement result, whether the object contacts another object at each shifted position for placing the object in the second space, and perform a second calculation, based on the second measurement result and a position candidate among the position candidates, to calculate a position of the robot hand for placing the object in the second space, the second calculation including determining, from the second measurement result, a protrusion amount of the object; and adding the protrusion amount to the position candidate to obtain the position of the robot hand for placing the object in the second space.

12. A picking method using a picking robot, the picking robot configured to transfer an object from a first space to a second space by using a robot hand, the picking method comprising:

measuring a shape of the object from above to acquire a first measurement result, the first measurement result being acquired when the object is placed in the first space;

measuring a shape of the object from a side of the object to acquire a second measurement result, the second measurement result being acquired while the robot hand raises the object from the first space;

performing a first calculation, based on the first measurement result, to calculate position candidates of the object in the second space in three directions that are not all parallel, the first calculation including shifting a position for placing the object in the second space in each of the three directions, and determining, using the first measurement result, whether the object contacts another object at each shifted position for placing the object in the second space, and performing a second calculation, based on the second measurement result and a position candidate among the position candidates, to calculate a position of the robot hand for placing the object in the second space, the second calculation including determining, from the second measurement result, a protrusion amount of the object, and adding the protrusion amount to the position candidate to obtain the position of the robot hand for placing the object in the second space.

13. A non-transitory computer-readable storage medium storing a program, the program configured to cause a computer to control a picking robot, the picking robot configured to transfer an object from a first space to a second space by using a robot hand, the program configured to cause a first measuring instrument to measure a shape of the object from above to acquire a first measurement result, the first measurement result being acquired when the object is placed in the first space, the program configured to cause a second measuring instrument to measure a shape of the object from a side of the object to acquire a second measurement result, the second measurement result being acquired while the robot hand raises the object from the first space, the program configured to cause the computer to:

receive the first measurement result from the first measuring instrument;

perform a first calculation, based on the first measurement result, to calculate position candidates of the object in the second space in three directions that are not all parallel, the first calculation including shifting a position for placing the object in the second space in each of the three directions, and determining, using the first measurement result, whether the object contacts another object at each shifted position for placing the object in the second space:

receive the second measurement result from the second measuring instrument; and perform a second calculation, based on the second measurement result and a position candidate among the position candidates, to calculate a position of the robot hand for placing the object in the second space, the second calculation including determining, from the second measurement result, a protrusion amount of the object, and adding the protrusion amount to the position candidate to obtain the position of the robot hand for placing the object in the second space.

* * * * *